Jan. 29, 1963 T. McKENZIE ETAL 3,075,533
WASHING OF CASEIN
Filed June 29, 1959 2 Sheets-Sheet 1
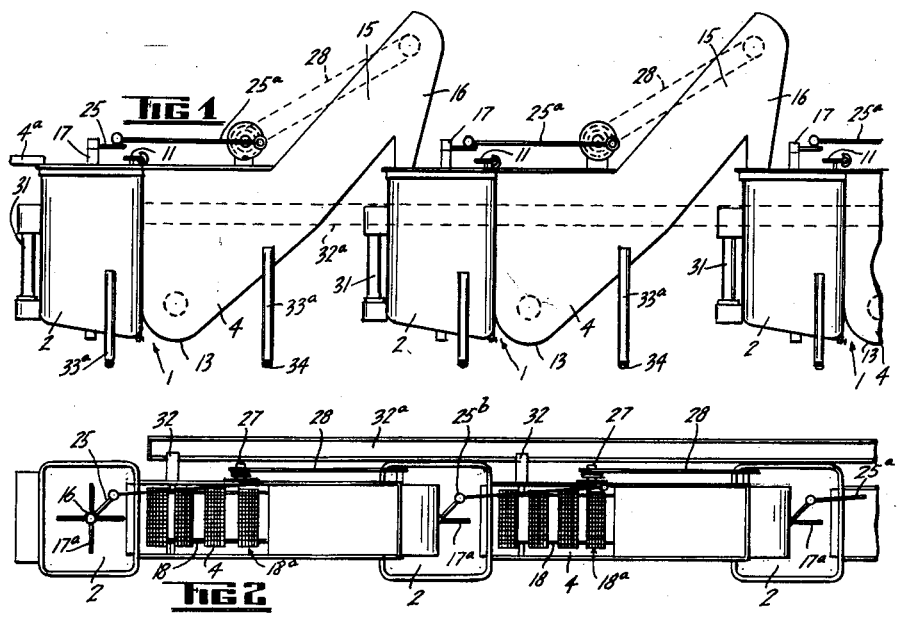
Inventors
T. McKenzie
W. C. Ridley
By Hancock Downing Weebold
Attys.

Jan. 29, 1963
T. McKENZIE ETAL
3,075,533
WASHING OF CASEIN
Filed June 29, 1959
2 Sheets-Sheet 2
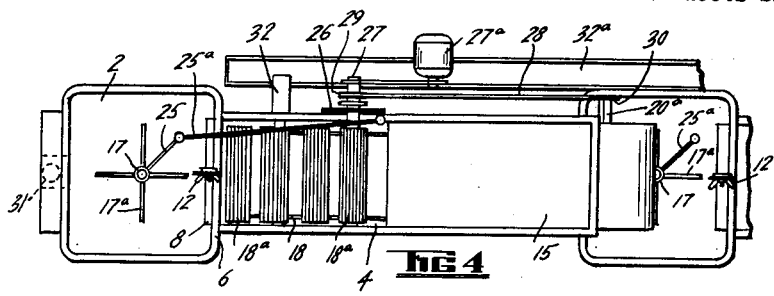
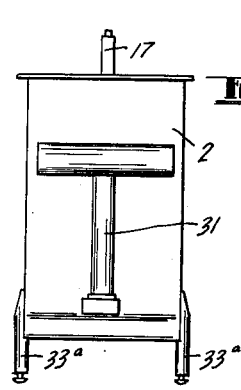
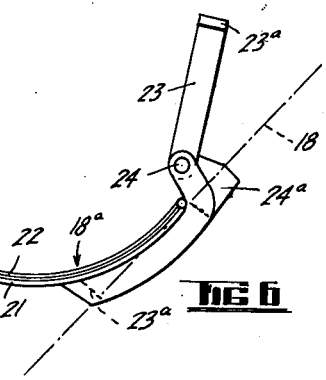
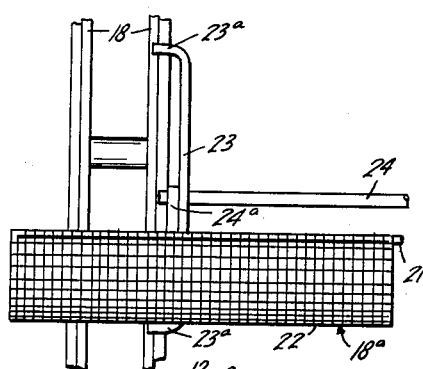
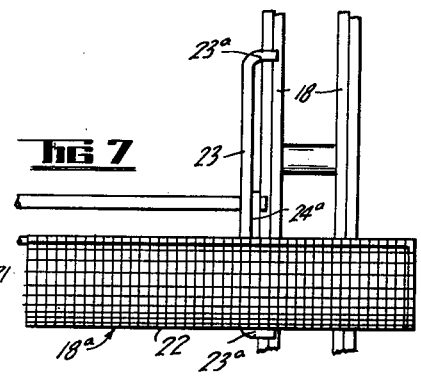
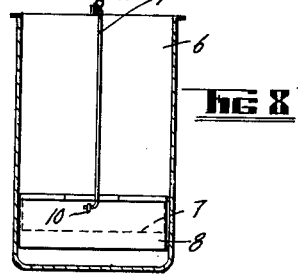
Inventors
T. McKenzie
W. C. Ridley 3,075,533
WASHING OF CASEIN
Thomas McKenzie and William Charles Ridley, both of 305 Church St., Penrose, Auckland, New Zealand
Filed June 29, 1959, Ser. No. 823,641
Claims priority, application New Zealand July 14, 1958
17 Claims. (Cl. 134—130)

The invention relates to means for washing casein and in particular to apparatus used in dairy factories for washing and preparing casein to a condition suitable for use.

Up to the present time, various types of apparatus have been devised for the purpose of washing and preparing casein ready for use in the manufacture of plastic and other purposes. However, it has been found that although such apparatus are capable of washing the casein with at least some limited degree of success, the process is usually lengthy and tedious, and moreover has a detrimental effect on the texture and quality of the casein itself.

With the aforementioned factors in mind, it is an object of the invention to provide an improved means for washing casein, which is not only capable of carrying out casein operations in a highly efficient manner and without any adverse affect to the texture or quality of the casein, but moreover enables casein washing operations to be carried out in a rapid and continuous method with a resultant saving in both time and labor when compared with former known casein washing methods.

According to one aspect of the invention, the improved means for washing casein comprises a hopper, agitating means movably mounted within the hopper, conveyor means also movably mounted within the hopper, casein being washed in water within the hopper by an agitating action of the agitating means, and the casein carried from the hopper by the conveyor means.

According to a second aspect of the invention the improved means for washing casein comprises a plurality of hoppers, agitating means movably mounted within each hopper, conveyor means also movably mounted within each hopper, the casein being washed in water within one hopper by agitating action of the agitating means, and the casein carried and strained from the hopper by the conveyor means and deposited in the next hopper to undergo a further such washing and straining operation.

According to a third aspect of the invention, the improved means for washing casein comprises a plurality of hoppers, each hopper being divided into a washing chamber and a settling chamber which are in communication with each other, agitating means movably mounted within each washing chamber, an endless type conveyor and straining means movably mounted within each settling chamber and leading upwardly from the settling chamber, casein being admitted to the washing chamber of the first hopper and washed in water by the movement of the agitating means, and the casein passed into the settling chamber and carried from the water and strained from the water by the endless conveyor and straining means, and deposited in the washing chamber of the next hopper to undergo a further such washing and straining operation.

The invention will now be described in the accompanying drawings in which:

FIG. 1 is a part view in elevation of the improved means for washing casein.

FIG. 2 is a plan view of FIG. 1.

FIG. 3 is a similar view to FIG. 1 but in section and on a larger scale.

FIG. 4 is a plan view of FIG. 3.

FIG. 5 is a part end view of FIG. 1.

FIG. 6 is a detail view in side elevation of the endless conveyor and straining means.

FIG. 7 is a view in end elevation of FIG. 6 while

FIG. 8 is a view in section of FIG. 5.

The following description makes reference to a plurality of hoppers and agitating and conveying apparatus so that the casein is subjected to several washing operations, the washing operation is however, merely repetitive to ensure that a thorough cleansing of the casein is carried out. Although it is preferred that a combination of hoppers and their associate apparatus be utilized in combination with one another to provide a continuous repeated washing operation, it follows that the invention is by no means confined to such a combination.

Referring now to the drawings, and with particular reference to FIGS. 1, 2, 3 and 4 of the drawings, there is provided a plurality of hoppers preferably three in number each indicated generally as at 1. The hoppers 1 are in the form of open topped box-like vats and in a preferred form of the invention are made of stainless steel. Each hopper 1 is divided into a washing chamber 2 in which the agitating means are mounted and a settling chamber 4 in which the endless conveyor and straining means generally indicated as at 5 (see FIG. 3) are mounted. More specifically, the washing chamber 2 is divided from the settling chamber 4 by an intervening wall 6 (see FIGS. 3 and 8) through which a port 7 is provided towards the bottom of the wall 6. The bottom of the washing chamber 2 is inclined downwardly towards the wall 6.

The way through the port 7 is controlled by a hinged shutter 8 hinged along the top edge of the port 7 and operated through the medium of a connecting link 9 pivotally secured to an arm 10 extending from the shutter 8 and a hand lever 11 pivotally mounted on the top of the wall 6 and to which the connecting link 9 is pivotally connected (see FIGS. 3 and 8). The hand lever 11 is capable of being set at a selected angle by means of a lock-nut 12 screw-threaded on a pivot bolt 12a of the hand lever 11. The lock-nut 12 is adapted to bear against the hand-lever 11 to lock the hand-lever 11 against the mounting of the pivot bolt 12a and lock the shutter 8 in a corresponding position, for instance in a fully opened, or partly opened position.

The settling chamber 4 of each hopper positioned immediately on the opposing side of the wall 6, is shaped with a curved convex bottom 13 which leads into, or continues in an upwardly direction as an inclined wall 14 (see FIG. 3) which in turn forms the bottom of an upwardly inclined and enclosed chute 15 extending above the level of the settling chamber 4 (see FIGS. 1 and 3) and in which the endless conveyor and straining means is housed as will later be described.

More particularly the enclosed chute 15 is rectangular in shape when viewed in cross-section and the upper end of the chute 15 terminates in, and is open to a vertically positioned and open bottomed funnel 16 leading downwardly from the upper end of the chute 15 and which is positioned immediately over the washing chamber 2 of the next hopper (see FIGS. 1 and 3) in which the second stage of washing is carried out.

The agitating means movably mounted in each washing chamber 2 of each hopper 1 is preferably of the paddle type agitator including a central and vertically positioned shaft 17 turnably mounted in suitable bearings and extending upwardly from the floor of the washing chamber 2. The shaft 17 is provided with a plurality of paddle arms 17a which extend radially from the shaft 17 at right angles (see FIGS. 3 and 4). Preferably the paddle arms 17a are provided in an upper and lower set, each set consisting of four paddle arms 17a set at right angles to one another. The shaft 17 is adapted to be moved in a reciprocating or, to and fro movement to agitate water and casein placed within the washing chamber 2 to wash casein placed within the washing chamber 2.

The endless type conveyor and straining means 5 within each settling chamber 4 is in the form of a pair of endless chains 18 on which a number of liquid straining buckets 18a are carried. More particularly the endless chains 18 are passed about a lower set of rotatable sprocket wheels 19 mounted on a shaft 19a rotatable in the side walls of the settling chamber 4 and positioned within the convex bottom 13 of the settling chamber 4. The endless chains 18 are then led upwardly into the enclosed chute 15 and passed about an upper set of sprocket wheels 20 mounted on a shaft 20a positioned at the upper end of the chute 15 and immediately above the funnel 16.

As illustrated in FIGS. 6 and 7, each straining bucket 18a consists of a metal frame 21 of concave curved formation when viewed in end elevation. A section of fairly close wire mesh 22 is secured on the frame 21. As illustrated in FIGS. 6 and 7, each straining bucket 18a is secured on the outer sides of the chains 18 in a manner so that when each bucket 18a in turn, completes its upward journey and passes about the uppermost set of sprocket wheels 20, the bucket 18a will drop or tilt to a lower position to jerk and eject casein clinging thereto into the funnel 16.

In further describing this aspect of the invention, a pair of curved or bent rocker arms 23 (see FIGS. 6 and 7) are welded to the bottom of the frame 21 of the bucket 18a. The rocker arms 23 are pivotally carried at a point adjacent their centres on a shaft 24 secured between a pair of mountings 24a extending from the chains 18. At each end of the rocker arms 23 an outwardly turned lug 23a is provided. The arrangement is such that when each bucket 18a is positioned on the upper side of the endless conveyor 5, i.e. when the bucket 18a is travelling in an upwardly direction, the lugs 23a extending from the lower ends of the rocker arms 23, are in contact with the chains 18 and maintain the buckets 18a in a more or less horizontal position, i.e. with the open or concave surfaces of the buckets 18a uppermost. However, when each bucket 18a in turn reaches the upper set of sprocket wheels 20 and moves about the latter to commence its downward journey, the bucket 18a tilts under gravity until the lugs 23a at the opposing or outer ends of the rocker arms 23, catch on the underside of the chains 18. As a result, each bucket 18a drops or tilts in an abrupt jerking movement to eject casein therefrom as has previously been described. The buckets 18a are maintained in such a tilted position during downward travel on the lower side of the chains 18 until each bucket passes about the lower set of sprocket wheels 19 and revert under gravity to their original position for their upward journey.

Motion of the moving parts of the improved apparatus can be applied by any approved means such as an independent prime mover, in respect to each hopper 1, driving a drive-shaft from which the agitator paddles and endless conveyor and straining means 5 are driven. More specifically and as shown in FIGS. 3 and 4, a lateral arm 25 extends from each shaft 17 of the agitating paddles 17a and a connecting rod 25a is secured by one end by a swivel connection 25b to the free end of the lateral arm 25. The opposing end of the connection rod 25a is similarly connected to a wheel 26 rotatably mounted on a drive shaft 27 situated on one side of the hopper 1. The arrangement is such that upon the drive shaft 27 and wheel 26 being rotated, the rod 25a is moved in a reciprocating movement to likewise move the agitator paddles 17a in a corresponding reciprocating movement to agitate water and casein placed within the washing chamber 2.

The drive shaft 27 which is drivably connected to a suitable prime mover, such as an electric motor 27a (see FIG. 4) also serves the purpose of applying driving motion to the endless conveyor and straining means 5 through a chain drive 28 which is passed about a sprocket wheel 29 on the drive shaft 27 and about a further sprocket wheel 30 mounted on the upper shaft 20a of the endless conveyor and straining means 5 (see FIG. 4).

Each hopper 1 is also provided with means for introducing hot water and/or steam into the hopper 1. As shown in FIGS. 1, 2, 3 and 4, such an arrangement can consist of a pipe 31 mounted on the leading side of each washing chamber 2 and which leads into the bottom portion of each washing chamber 2. Each pipe 31 is connected to a source of supply of heated water.

An outlet pipe 32 leads from each settling chamber 4 (see FIG. 4) adjacent the top edge of one of the side walls of the settling chamber 4, each outlet pipe 32 leading to a common flume 32a mounted along the side of the hoppers 1 and by means of which waste water passing from each settling chamber 4 is disposed of.

As illustrated in FIG. 3 of the drawings it is preferred that a suitable straining means such as gauze 33 be provided over the entrance to each outlet pipe 32 to prevent the finer particles of casein, known in the trade as "fines" from passing from the apparatus with the waste water. It will also be appreciated from the aforegoing description that by providing an outlet pipe 32 leading from each settling chamber 4 adjacent the top edge of the latter, both the washing chamber 2 and the settling chamber 4 are filled to near capacity with heated water and furthermore a continuous supply of clean heated water can be passed through the washing chamber 2 and settling chamber 4 to maintain a high degree of washing efficiency.

A drain cock 32b is provided in the bottom of each washing chamber 2.

As illustrated in FIGS. 1 and 3, of the drawings, each hopper 1 is mounted on a plurality of adjustable legs, preferably four such legs being provided. Each leg consists of an outer tubular vertical member 33a secured to the underside of the hopper 1, each outer tubular member 33a having an inner tubular foot member 34 screw-threaded within its open bottom end which makes actual contact with the ground or floor surface. The arrangement is such that by rotating the foot member 34 within the outer member 33a, the length of each leg can be adjusted to level each hopper 1.

As illustrated in FIGS. 1 and 2 of the drawings, a number of hoppers 1 are used in the washing of casein, the casein being introduced into each hopper 1 in turn and subjected to a washing and straining operation as will later be described. For instance, as illustrated in FIGS. 1 and 2 of the drawings, three such hoppers 1 as have been described, are mounted one behind the other and in combination so that washed casein emerging from one hopper 1 will fall within the next hopper 1 to undergo the same washing and straining operation.

In operation, heated water is introduced into the washing chamber 2 of the leading hopper 1 via the water inlet pipe 31 and control valve until both the washing and settling chambers 2 and 4 are filled to within a short distance of their top edges.

A selected quantity of unwashed casein is then dropped into the washing chamber 2 preferably from the tray or belt conveyor 4a (see FIG. 1) of a curd and whey separator which can be used in combination with the casein washing apparatus and positioned immediately forward of the leading hopper 1 so that casein will gravitate therefrom into the washing chamber 2 of the leading hopper 1.

The electric motor 27a drivably connected to the drive shaft 27 of the unit, is then set in motion so that the drive shaft 27 and its wheel 26 are rotated to apply a reciprocating motion to the agitator shaft 17 and paddle arms 17a to agitate the heated water and casein within the washing chamber 2 to carry out washing of the casein.

The casein within the washing chamber 2 is held in suspension by the agitating motion of the paddle arms 17a which also tend to move the casein in a path of travel towards the surface of the water and then down the side of the wall 6 at a rate governed by the position of the adjustable shutter 8 in the port 7, and the volume of water entering the washing chamber 2. For example, the shutter 8 can be set in a partly opened position per medium of its lock-nut 12 so that only a small quantity of casein at a time passes through the port 7 to enable the casein to be subjected to a washing operation of predetermined duration. On the other hand the shutter 8 may be set in a fully opened position to shorten the duration of the washing operation.

Upon the casein entering the settling chamber 4, it immediately comes into contact with the endless conveyor and straining means 5 which is moved about the sprocket wheels 19 and 20 in a clock-wise direction through the medium of the chain drive 28 and drive shaft 27 driven by the electric motor 27a. In further describing this aspect of the operation, the endless conveyor is moved at a slow rate so that the water is not disturbed to any great extent allowing the casein to settle towards the straining buckets 18a as the casein enters the settling chamber 4 as each straining bucket 18a in turn, passes in close proximity to the port 7 after completing its downward journey. As each straining bucket 18a in turn moves about the lower set of sprocket wheels 19, it picks up casein and lifts and strains the casein from the water as each bucket 18a rises above the level of the water. When each straining bucket 18a in turn passes over the upper set of sprocket wheels 20, the straining bucket 18a drops or tilts to its lower position relative to the endless chains 18 (see FIG. 3), to eject the casein therefrom. The casein then gravitates through the funnel 16 into the washing chamber 2 of the next hopper 1 where the washing operation as has been described, is repeated, or in the case of the last hopper 1, the casein falls through the funnel 16 into a suitable container.

What we do claim and desire to obtain by Letters Patent of the United States of America, is:

1. An improved means for washing casein comprising a plurality of hoppers, each hopper being divided into a washing chamber and a settling chamber by an intervening wall having a port leading therethrough and connecting the two chambers, a hinged shutter for the port for controlling communication between the chambers, reciprocable agitating means movably mounted within each washing chamber, an endless type conveyor and straining means movably mounted within each settling chamber and leading upwardly from the settling chamber to the next hopper, casein being admitted to the washing chamber of the first hopper and washed in water by movement of the agitating means, and the casein passed into the settling chamber and carried from the water and strained from the water by the endless conveyor and straining means, and deposited in the washing chamber of the next hopper to undergo a further such washing and straining operation.

2. Means for washing casein as claimed in claim 1 and wherein movement of the shutter is controlled by means of a connecting link pivotally connected by one end to an arm extending from the shutter and a hand-lever pivotally mounted on the top of the intervening wall.

3. Means for washing casein as claimed in claim 2 and wherein the shutter is capable of being set in a closed, opened, or partly opened position by means of a lock-nut screwthreaded on a pivot bolt of the hand-lever, the said lock-nut being adapted to bear against the hand-lever to lock the hand-lever against movement.

4. An improved means for washing casein comprising a plurality of hoppers, each hopper being divided into a washing chamber and a settling chamber which are in controllable communication with each other, reciprocatable agitating means movably mounted within each washing chamber, an endless type conveyor and straining means movably mounted within each settling chamber and leading upwardly from the settling chamber to the next hopper, casein being admitted to the washing chamber of the first hopper and washed in water by movement of the agitating means, and the casein passed into the settling chamber and carried from the water and strained from the water by the endless conveyor and straining means, and deposited in the washing chamber of the next hopper to undergo a further such washing and straining operation, the settling chamber in which the endless type conveyor and straining means is mounted being formed with a chute extending upwardly therefrom and beyond the top edge of the settling chamber as a continuation of the settling chamber, the chute leading into a downwardly directed funnel, the endless conveyor and straining means being inclined upwardly within the settling chamber and the chute, the said endless conveyor and straining means consisting of two endless chains provided with buckets attached across the outside of the chains, each bucket being of concave formation when viewed in end elevation and consisting of a frame loosely connected to the endless chains, and a section of wire mesh secured on the frame.

5. Means for washing casein as claimed in claim 4 and wherein the frame of each bucket is secured on a pair of rocker arms which are pivotally connected to the endless chains, the said rocker arms being adapted to maintain the buckets positioned on the upper side of the endless chains in a substantially horizontal position and to maintain the buckets positioned on the under side of the endless chains in a tilted position.

6. Means for washing casein as claimed in claim 5 and wherein the rocker arms of each pair are curved or bent in a corresponding formation, and are pivotally secured at adjacent their centres on a shaft secured across the endless chains, the outer ends of the rocker arms being shaped with inturned lugs two of which engage against the endless chains to hold the bucket in a substantially horizontal position, when the bucket is positioned on the upper side of the endless chains, the remaining two inturned lugs engaging the endless chains when the bucket and rocker arms tilt when on the under side of the endless chains to maintain the bucket in its tilted position.

7. Means for washing casein as claimed in claim 5 and wherein the endless chains are passed about sprocket wheels rotatably mounted in the bottom of the settling chamber and about sprocket wheels rotatably mounted in the top portion of the chute.

8. Means for washing casein as claimed in claim 5 and wherein the sprocket wheels are mounted on shafts rotatably carried in the walls of the settling chamber and chute, one of the said shafts being drivably connected to a prime mover through a chain and sprocket drive and a drive shaft.

9. An improved means for washing casein comprising a plurality of hoppers, each hopper being divided into a washing chamber and a settling chamber which are in controllable communication with each other, reciprocatable agitating means movably mounted within each washing chamber, an endless type conveyor and straining means movably mounted within each settling chamber and leading upwardly from the settling chamber to the next hopper, casein being admitted to the washing chamber of the first hopper and washed in water by movement of the agitating means, and the casein passed into the settling chamber and carried from the water and strained from the water by the endless conveyor and straining means, and deposited in the washing chamber of the next hopper to undergo a further such washing and straining operation, the agitating means comprising a series of paddles extending radially from a vertical shaft rotatably mounted within each washing chamber, the shaft being drivably connected to a prime mover through a connecting rod, drive wheel and drive shaft in a manner to provide the reciprocatable motion to the shaft and paddles.

10. Means for washing casein as claimed in claim 9 and wherein one end of the connecting rod is connected by a swivel connection to an arm extending laterally from the shaft and the remaining end of the connecting rod is connected by a swivel connection to a side of a wheel mounted on and driven by the drive shaft.

11. An improved means for washing casein comprising a series of hoppers, dividing means separating each hopper into a washing chamber and a settling chamber, said dividing means having a port therein providing communication between said chambers, an adjustable shutter positioned at said port for controlling flow therethrough, an endless conveyor means extending into said settling chamber and leading to the next hopper, upper and lower sprocket wheels supporting said endless conveyor means in inclined relation, straining means on said endless conveyor means comprising tiltable screen-type straining buckets, rocker arm means connected to the bucket to that side thereof that constitutes the bottom when the bucket is moving upwardly and operable in response to passage of each bucket over the upper sprocket wheel to cause an abrupt tilting motion of each bucket to effect forcible discharge of the contents thereof.

12. Means for washing casein as claimed in claim 11, wherein said endless conveyor moves through an upwardly extending chute formed with said settling chamber.

13. Means for washing casein as claimed in claim 11, wherein said tiltable screen-type straining buckets comprise a metal frame of internally concave curvature with a screen secured thereto and an articulated rocker arm connected to said frame.

14. Means for washing casein as claimed in claim 13, wherein said screen-type bucket is tilted by said articulated rocker arm while passing over said upper sprocket so as to forcibly eject the contents of said bucket into a downwardly directed funnel.

15. The structure recited in claim 14, wherein said bucket remains in a tilted position after ejection of its contents until its upward movement is begun.

16. Means for washing casein as claimed in claim 11, wherein a reciprocating agitator is positioned in said washing chamber.

17. Means for washing casein as claimed in claim 16, wherein motor means are provided to operate said agitator and said endless conveyor.

References Cited in the file of this patent

UNITED STATES PATENTS

| | | |
|---|---|---|
| 797,171 | Cerruti | Aug. 15, 1905 |
| 832,178 | Weinland | Oct. 2, 1906 |
| 1,247,336 | Saunders | Nov. 20, 1917 |
| 1,381,347 | Schaller | June 14, 1921 |
| 1,707,302 | Godsey | Apr. 2, 1929 |
| 1,710,357 | Grunwald | Apr. 23, 1929 |
| 1,772,669 | Lane | Aug. 12, 1930 |
| 1,782,238 | Kirchhan | Nov. 18, 1930 |
| 2,039,276 | Ayars | May 5, 1936 |
| 2,102,943 | Cook | Dec. 21, 1937 |
| 2,249,792 | Skinner | July 22, 1941 |
| 2,422,656 | Carter | June 24, 1947 |
| 2,619,100 | Palotsee | Nov. 25, 1952 |